US012503669B2

(12) United States Patent
Kanniainen et al.

(10) Patent No.: US 12,503,669 B2
(45) Date of Patent: Dec. 23, 2025

(54) DETERGENT COMPOSITIONS COMPRISING ULTRA-LOW MOLECULAR WEIGHT POLYSACCHARIDES

(71) Applicant: NOURYON CHEMICALS INTERNATIONAL B.V., Amsterdam (NL)

(72) Inventors: Marko Kanniainen, Äänekoski (FI); Pirkko-Leena Hakkarainen, Huutomäki (FI); Andries Hanzen, Ede (NL)

(73) Assignee: NOURYON CHEMICALS INTERNATIONAL B.V., Amsterdam (NL)

( * ) Notice: Subject to any disclaimer, the term of this patent is extended or adjusted under 35 U.S.C. 154(b) by 294 days.

(21) Appl. No.: 16/326,632

(22) PCT Filed: Sep. 27, 2017

(86) PCT No.: PCT/EP2017/074520
§ 371 (c)(1),
(2) Date: Feb. 19, 2019

(87) PCT Pub. No.: WO2018/060262
PCT Pub. Date: Apr. 5, 2018

(65) Prior Publication Data

US 2019/0390140 A1 Dec. 26, 2019

Related U.S. Application Data

(60) Provisional application No. 62/400,752, filed on Sep. 28, 2016, provisional application No. 62/519,687, filed on Jun. 14, 2017.

(51) Int. Cl.

| | |
|---|---|
| *C11D 1/02* | (2006.01) |
| *C11D 1/00* | (2006.01) |
| *C11D 1/66* | (2006.01) |
| *C11D 1/83* | (2006.01) |
| *C11D 3/00* | (2006.01) |
| *C11D 3/22* | (2006.01) |
| *C11D 3/37* | (2006.01) |
| *C11D 3/38* | (2006.01) |

(52) U.S. Cl.
CPC .............. *C11D 3/225* (2013.01); *C11D 1/008* (2013.01); *C11D 3/0036* (2013.01); *C11D 3/228* (2013.01); *C11D 3/3796* (2013.01); *C11D 3/38* (2013.01)

(58) Field of Classification Search
CPC .... C11D 1/02; C11D 1/66; C11D 1/83; C11D 3/22; C11D 3/225
See application file for complete search history.

(56) References Cited

U.S. PATENT DOCUMENTS

| | | | | |
|---|---|---|---|---|
| 5,278,304 | A | 1/1994 | Kniewske et al. | |
| 7,842,658 | B2 | 11/2010 | Guckenbiehl et al. | |
| 8,349,789 | B2 | 1/2013 | Lant | |
| 8,858,651 | B2 | 10/2014 | Miracle et al. | |
| 2004/0005993 | A1* | 1/2004 | Hartshorn ............ | C11D 3/3776 510/445 |
| 2007/0249516 | A1* | 10/2007 | Zhu .......................... | C11D 1/62 510/521 |
| 2009/0318326 | A1 | 12/2009 | Lant | |
| 2010/0075887 | A1 | 3/2010 | Wang et al. | |
| 2011/0034365 | A1* | 2/2011 | Lant ....................... | C11D 3/226 510/298 |
| 2012/0122998 | A1* | 5/2012 | Palla-Venkata ........ | A61K 8/345 514/772.5 |
| 2012/0304402 | A1 | 12/2012 | Miracle et al. | |
| 2015/0051134 | A1 | 2/2015 | Miracle et al. | |
| 2019/0390140 | A1 | 12/2019 | Kanniainen | |

FOREIGN PATENT DOCUMENTS

| | | | | |
|---|---|---|---|---|
| CN | 103201367 | * | 7/2013 | ............... A61K 8/73 |
| CN | 103201367 | A | 7/2013 | |
| EP | 0100125 | A2 | 2/1984 | |
| EP | 0511540 | A2 | 11/1992 | |
| JP | 55-34256 | A | 3/1980 | |
| JP | S 55-34256 | A | 3/1980 | |
| JP | 2008-50410 | A | 3/2008 | |
| JP | 2008-50411 | A | 3/2008 | |
| JP | 2019-530775 | A | 10/2019 | |
| PL | 231176 | B1 | 11/1982 | |
| RU | 2466182 | C2 | 11/2012 | |
| RU | 2598853 | C2 | 9/2016 | |
| WO | 98/29528 | A2 | 7/1998 | |
| WO | 2007118732 | A1 | 10/2007 | |
| WO | 2018/060262 | A1 | 4/2018 | |

OTHER PUBLICATIONS

International Search Report and Written Opinion for International Application No. PCT/EP2017/074520, mailed Dec. 21, 2017.
CP Kelco CMC Book: Carboxymethylcellulose (CMC), 1stEdition, 2009, downloaded on Jul. 13, 2020, from the website cpkelco.com.
English translation of Office Action issued in counterpart JP Patent Application No. 2019-516461 dated Apr. 5, 2022 (Received Apr. 14, 2022).

* cited by examiner

*Primary Examiner* — Brian P Mruk
(74) *Attorney, Agent, or Firm* — Ingrassia, Fisher & Lorenz, LLP

(57) ABSTRACT

Detergent compositions are provided that include a polysaccharide selected from a carboxymethyl cellulose component, an anionic cellulose derivative, or mixtures thereof and a surfactant system, wherein the polysaccharide has a molecular weight of no greater than from about 1,000 Dalton to 80,000 Dalton.

21 Claims, No Drawings

DETERGENT COMPOSITIONS COMPRISING ULTRA-LOW MOLECULAR WEIGHT POLYSACCHARIDES

This application is a National Stage Application of International Application No. PCT/EP2017/074520, filed 27 Sep. 2017, which claims benefit of Ser. No. 62/519,687, filed 14 Jun. 2017 in the United States and Ser. No. 62/400,752, filed 28 Sep. 2016 in the United States, and which applications are incorporated herein by reference. To the extent appropriate, a claim of priority is made to each of the above disclosed applications.

BACKGROUND

Carboxymethyl celluloses (CMCs) having molecular weights greater than 80,000 Dalton (i.e., conventional carboxymethyl cellulose), are incorporated into laundry detergent products to improve the soil suspension profile, as well as other benefits such as anti-redeposition, anti-scaling, and water softening. Conventional carboxymethyl celluloses are also incorporated into other detergent systems for rheology and foam control. Unfortunately, these conventional carboxymethyl celluloses have significant limitations with respect to surfactant compatibilities. As a result, given that detergent products are generally surfactant systems, these conventional carboxymethyl celluloses often lead to a loss of transparency and/or stability due to clouding, gelling, and/or phase separation, thereby limiting their use in liquid detergent products. In effort to minimize these effects, structuring agents, such as microfibrous cellulose, are added and/or the conventional carboxymethyl cellulose undergoes ultrafine milling, both of which increase manufacturing costs, time and complexity, see e.g., U.S. Pat. No. 7,842,658, WO 2014/052317, U.S. Patent Publication No. 2008/0108541, and U.S. Pat. No. 8,642,529.

Accordingly, there remains a need for improved detergent compositions having carboxymethyl celluloses or cellulose derivatives thereof that are more compatible with surfactant systems, thereby ameliorating some or all of the foregoing undesirable effects on the overall compositions.

SUMMARY

Detergent compositions are provided, which include a polysaccharide selected from a carboxymethyl cellulose component, an anionic cellulose derivative, or mixtures thereof, and a surfactant system; wherein the polysaccharide has a molecular weight no greater than from about 1,000 Dalton (Da) to 80,000 Da. Also provided is a laundry detergent composition comprising a carboxymethyl cellulose component at a concentration from about 0.005% to about 10% by weight of the detergent composition and a surfactant system at a concentration from about 0.01% to about 70% by weight of the detergent composition; wherein the carboxymethyl cellulose component has a weight average molecular weight of no greater than from about 1,000 Da to 80,000 Da, any molecular weight peak of the carboxymethyl cellulose component is no greater than about 80,000 Da, and the laundry detergent composition is in a liquid form. Also provided is use of a polysaccharide selected from the group consisting of a carboxymethyl cellulose component, an anionic cellulose derivative, and mixtures thereof, in a detergent; wherein the polysaccharide has an average molecular weight of no greater than from about 1,000 Dalton to 80,000 Dalton.

DETAILED DESCRIPTION

Improved detergent compositions have been developed, particularly detergent compositions that include certain polysaccharides, which are selected from a carboxymethyl cellulose component, an anionic cellulose derivative, or mixtures thereof and have a weight average molecular weight ($M_w$) no greater than from about 1,000 Da to 80,000 Da, and a surfactant system.

As used herein, detergent compositions include powder or liquid laundry detergents, powder or liquid dishwashing detergents, liquid hand soap, and powder or liquid industrial detergents.

As used herein, molecular weight ($M_w$) is the weight average molecular weight unless the context indicates otherwise.

As used herein, an "ultra-low molecular weight" means a molecular weight ($M_w$) no greater than from about 1,000 Dalton (Da) to 80,000 Dalton (Da).

As used herein, "conventional" means a molecular weight ($M_w$) that is greater than 80,000 Da.

Values or ranges may be expressed herein as "about", from "about" one particular value, and/or to "about" another particular value. When such values or ranges are expressed, other aspects disclosed include the specific value recited, from the one particular value, and/or to the other particular value. Similarly, when values are expressed as approximations, by use of the antecedent "about," it will be understood that the particular value forms another aspect. It will be further understood that there are a number of values disclosed therein, and that each value is also herein disclosed as "about" that particular value in addition to the value itself. In aspects, "about" can be used to mean, for example, within 10% of the recited value, within 5% of the recited value, or within 2% of the recited.

Several aspects of detergent compositions and methods of manufacture are described herein. Parameters of different steps, components, and features of the aspects are described separately, but may be combined consistently with this description of claims to enable other aspects as well to be understood by those skilled in the art. Various terms used herein are likewise defined in the description which follows. Concentrations and percentages are in weight percent unless the context indicates otherwise.

Without being bound to a single theory, it is believed that lowering the molecular weight of certain polysaccharides, such as a carboxymethyl cellulose component, an anionic cellulose derivative, or mixtures thereof changes the compatibility with other ingredients such as organic solvents, salts, and surfactants. By using an ultra-low molecular weight polysaccharide rather than a conventional polysaccharide in the detergent, the inventors have discovered the ability to formulate liquid detergent compositions having improved properties such as transparency and stability.

Furthermore, where the detergent composition is in liquid form, the ultra-low molecular weight polysaccharide may be partially or completely dissolved within the composition, and therefore is in an active state within the composition. This is advantageous because when the washing cycle starts, the ultra-low molecular weight polysaccharide can begin to impart anti-redepositioning without first having to dissolve into its active state. That is, the ultra-low molecular weight polysaccharide may be capable of becoming functional at the beginning of the wash cycle independent of the washing temperature.

The ability of the ultra-low molecular weight polysaccharide to partially or completely dissolve in a liquid detergent composition is further advantageous because it can improve the transparency of the composition. With the dissolving of the ultra-low molecular weight polysaccharide in the liquid detergent composition, there are little to no solid polysaccharide particles present in the composition, which are known to cause haziness when using conventional polysaccharides. Additionally, the solubility of the ultra-low molecular weight polysaccharide beneficially provides stability to the liquid detergent compositions without the need for structuring agents and/or for milling of the ultra-low molecular weight polysaccharide into an ultrafine powder.

Optionally, the ultra-low molecular weight polysaccharide is a carboxymethyl cellulose component such as sodium carboxymethyl cellulose or modified carboxymethyl cellulose such as, but not limited to, hydrophobic-modified CMC, cationic-modified CMC, or sulfate- or sulfonate-modified CMC. The interchangeability of the use of carboxymethyl cellulose and its modified forms in detergent applications is well known in the art as described in EP2302025B1 and U.S. Pat. No. 6,600,033, both of which are incorporated by reference herein. Reference herein to carboxymethyl cellulose (CMC) component is also meant to include modifications thereof.

The detergent compositions may comprise an anionic cellulose derivative such as, but not limited to, carboxymethyl hydroxyethylcellulose, and carboxymethyl hydroxylpropyl cellulose (HPC).

Any further reference to ultra-low molecular weight polysaccharide is to include the aforementioned polysaccharides selected from a carboxymethyl cellulose component, an anionic cellulose derivative, or mixtures thereof.

Detergent compositions have been developed in which these compositions maintain transparency and stability, while improving anti-redepositioning properties. The present detergent compositions may be in a liquid or particulate form.

The ultra-low molecular weight polysaccharides may have a molecular weight of no greater than from about 1,000 Da to 80,000 Da. For example, the ultra-low molecular weight polysaccharide has a molecular weight of from about 1,000 Da to about 40,000 Da. Or, the ultra-low molecular weight polysaccharide may have a molecular weight from about 1,000 Da to about 30,000 Da. Alternatively, the ultra-low molecular weight polysaccharide may have a molecular weight from about 1,000 Da to about 15,000 Da. For example, the ultra-low molecular weight polysaccharide may have a molecular weight of 1,000 Da, 2,000 Da, 3,000 Da, 4,000 Da, 5,000 Da, 6,000 Da, 7,000 Da, 8,000 Da, 9,000 Da, 10,000 Da, 11,000 Da, 12,000 Da, 13,000 Da, 14,000 Da, 15,000 Da, 16,000 Da, 17,000 Da, 18,000 Da, 19,000 Da, 20,000 Da, 21,000 Da, 22,000 Da, 23,000 Da, 24,000 Da, 25,000 Da, 26,000 Da, 27,000 Da, 28,000 Da, 29,000 Da, 30,000 Da, 31,000 Da, 32,000 Da, 33,000 Da, 34,000 Da, 35,000 Da, 36,000 Da, 37,000 Da, 38,000 Da, 39,000 Da, 40,000 Da, 41,000 Da, 42,000 Da, 43,000 Da, 44,000 Da, 45,000 Da, 46,000 Da, 47,000 Da, 48,000 Da, 49,000 Da, 50,000 Da, 51,000 Da, 52,000 Da, 53,000 Da, 54,000 Da, 55,000 Da, 56,000 Da, 57,000 Da, 58,000 Da, 59,000 Da, 60,000 Da, 61,000 Da, 62,000 Da, 63,000 Da, 64,000 Da, 65,000 Da, 66,000 Da, 67,000 Da, 68,000 Da, 69,000 Da, 70,000 Da, 71,000 Da, 72,000 Da, 73,000 Da, 74,000 Da, 75,000 Da, 76,000 Da, 77,000 Da, 78,000 Da, 79,000 Da, or 80,000 Da. The ultra-low molecular weight polysaccharides of this disclosure can also have a molecular weight between any of these recited molecular weights.

The ultra-low molecular weight polysaccharides and, in particular, the ultra-low molecular weight CMC component may have a molecular weight distribution that is unimodal, bimodal or multimodal and in each case the molecular weight peaks ($M_P$) are no greater than 80,000 Da. For example, the molecular weight peaks may be from about 750 to 60,000 Da.

Optionally, the ultra-low molecular weight polysaccharide and, in particular, the ultra-low molecular weight CMC component is present in the detergent composition at a concentration from about 0.005% to about 10% by weight of the detergent composition. For example, the ultra-low molecular weight polysaccharide is present in the detergent composition at a concentration from about 0.01% to about 5% by weight of the detergent composition. Or, the ultra-low molecular weight polysaccharide may be present in the detergent composition at a concentration from about 0.05% to about 2% by weight of the detergent composition. For example, the ultra-low molecular weight polysaccharide is present in the detergent composition at a concentration of about 0.005%, 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, 1.1%, 1.2%, 1.3%, 1.4% 1.5%, 1.6%, 1.7%, 1.8%, 1.9%, 2%, 2.1%, 2.2%, 2.3%, 2.4% 2.5%, 2.6%, 2.7%, 2.8%, 2.9%, 3%, 3.1%, 3.2%, 3.3%, 3.4% 3.5%, 3.6%, 3.7%, 3.8%, 3.9%, 4%, 4.1%, 4.2%, 4.3%, 4.4% 4.5%, 4.6%, 4.7%, 4.8%, 4.9%, 5%, 5.1%, 5.2%, 5.3%, 5.4% 5.5%, 5.6%, 5.7%, 5.8%, 5.9%, 6%, 6.1%, 6.2%, 6.3%, 6.4% 6.5%, 6.6%, 6.7%, 6.8%, 6.9%, 7%, 7.1%, 7.2%, 7.3%, 7.4% 7.5%, 7.6%, 7.7%, 7.8%, 7.9%, 8%, 8.1%, 8.2%, 8.3%, 8.4% 8.5%, 8.6%, 8.7%, 8.8%, 8.9%, 9%, 9.1%, 9.2%, 9.3%, 9.4% 9.5%, 9.6%, 9.7%, 9.8%, 9.9%, or 10% by weight of the detergent composition. The ultra-low molecular weight polysaccharide can also be present in the detergent composition at a concentration between any of these recited percentages.

It has been discovered that the ultra-low molecular weight polysaccharides and, in particular, the ultra-low molecular weight CMC components have surprisingly increased solubility within a liquid detergent composition. This increase in solubility is advantageous because incorporating the ultra-low molecular weight polysaccharide with the ability to partially or completely dissolve within a liquid detergent composition allows for the ultra-low molecular weight polysaccharide to become functional soon after use initiates, which therefore enables the ultra-low molecular weight polysaccharide to function earlier in the wash cycle, as compared to conventional polysaccharides. Thus, by incorporating an ultra-low molecular weight polysaccharide into a liquid detergent composition, the wash cycle time therefore can be beneficially decreased.

Further, the surprising increased solubility of the ultra-low molecular weight polysaccharides may also result in shorter activation times when incorporated into powder detergent compositions, thereby advantageously providing a detergent composition that has the ability to begin working earlier in the wash cycle. By incorporating the ultra-low molecular weight polysaccharides, which have the ability to become active in a shorter period of time, as compared to conventional polysaccharides, the resulting powder detergent compositions may therefore also decrease the wash cycle time.

Without being bound by a single theory, it is also believed that with respect to the ultra-low molecular weight CMC components the solubility of can also be improved by increasing its degree of substitution. The ultra-low molecular weight CMC component may have a degree of substitution from about 0.2 to about 1.5. For example, the ultra-low molecular weight CMC component may have a degree of substitution from about 0.4 to about 1.2. Or, the ultra-low molecular weight CMC component may have a degree of substitution from about 0.6 to about 1. For example, the ultra-low molecular weight CMC component may have a degree of substitution of 0.2, 0.3, 0.4, 0.5, 0.6, 0.7, 0.8, 0.9, 1.0, 1.1, 1.2, 1.3, 1.4, or 1.5. The ultra-low molecular weight CMC component can also have a degree of substitution that is in a range between any of these recited degrees of substitution.

Generally, the degree of substitution may be measured by any techniques known in the art. For example, the degree of substitution, including those disclosed herein, may be measured by the following analysis method: a sample of CMC at a known weight was burned to ash, i.e., heated for 45 minutes at 650° C., then cooled to 25° C.; the cooled sample was then dissolved in distilled water having a temperature of 80° C. to form a sample mixture; the sample mixture was then cooled to 70° C., and thereafter titrated by 0.1N sulphuric acid by using methyl red as the indicator. The degree of substitution (DS) is calculated by the following formula, where b is the amount of acid consumption (mL) and G is the weight of the sample (grams):

$$\text{Degree of Substitution } (DS) = \frac{0.162 * 0.1\left(\frac{b}{G}\right)}{1 - \left(0.08 * 0.1\left(\frac{b}{G}\right)\right)}$$

Further, without being bound by a single theory, it is believed that increasing the degree of substitution of the ultra-low molecular weight CMC component can also minimize degradation of the ultra-low molecular weight CMC component by enzymes that are typically present within the laundry detergent. Additionally, or in the alternative, to help minimize this degradation of the ultra-low molecular weight CMC component, the ultra-low molecular weight may also be further derivatized, e.g., hydrophobic modification. A multi-component liquid detergent dosage system may be provided such that the enzymes are in one compartment of the system and are therefore separated from the ultra-low molecular weight CMC component until use of the liquid detergent.

Further, without being bound by a single theory it is also believed that by incorporating a soluble ultra-low molecular weight polysaccharide in a liquid detergent composition beneficially and surprisingly improves the clarity of the resulting composition. This is believed to be because the soluble ultra-low molecular weight polysaccharide minimizes, if not eliminates, the presence of any solid polysaccharide particles within the liquid detergents, which if otherwise present they would cause haziness, and therefore, negatively impact the overall clarity of the liquid detergent composition. For example, the detergent composition may have a high clarity represented by a high transmittance value of 61, 62, 63, 64, 65, 66, 67, 68, 69, 70, 71, 72, 73, 74, 75, 76, 77, 78, 79, 80, 81, 82, 83, 84, 85, 86, 88, 89, 90, 91, 92, 93, 94, 95, 96, 97, 98, 99 or 100% at 0.1, 0.2, 0.3, 0.4 or 0.5% CMC or anionic cellulose by weight concentration of detergent. For example, a transmittance value of 96-100% at 0.1, 0.2, 0.3, 0.4 or 0.5% CMC or anionic cellulose by weight concentration of detergent.

Generally, the clarity of the detergent compositions disclosed herein may be measured by any techniques known in the art. For example, the clarity may be determined by measuring the transmittance of the detergent composition.

It is known that liquid detergent compositions that include conventional polysaccharides are generally unstable due to the resulting phase separation of the conventional polysaccharides. Phase separation is undesirable because, among other reasons, it negatively impacts the clarity of the overall liquid detergent compositions. As a result, structuring agents that are added to such detergents and/or the conventional polysaccharides undergo ultrafine milling.

It has been discovered, however, that minimal, if any, phase separation occurs in liquid detergent compositions that contain ultra-low molecular weight polysaccharides. Without being bound by a single theory, it is believed that this is due to the ability of the ultra-low molecular weight polysaccharides to partially or completely solubilize within a liquid detergent. As a result, unlike with conventional detergent compositions which contain conventional polysaccharides, structuring agents are not needed and/or ultrafine milling of the ultra-low molecular weight polysaccharide is not necessary in order to minimize or prevent phase separation, and consequently, to maintain the clarity of the detergent compositions. For example, the detergent composition may not comprise cellulosic fibrous structuring agents such as microfibrous cellulose, nanofibrous cellulose or bacterial cellulose. For example, the detergent composition may have a good stability represented by a phase separation of 0-3, 4, 5, 6, 7, 8, or 9 mm at 0.1, 0.2, 0.3, 0.4 or 0.5% CMC or anionic cellulose by weight concentration of detergent.

Optionally, the surfactant system is present in the detergent composition at a concentration from about 0.01% to about 70% by weight of the detergent composition. For example, the surfactant system may be present in the detergent composition at a concentration from about 1% to about 40% by weight of the detergent composition. Or, the surfactant system may be present in the detergent composition at a concentration from about 10% to about 40% by weight of the detergent composition. For example, the surfactant system may be present in the detergent composition at a concentration of 0.01%, 0.05%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, or 70% by weight of the detergent composition. The surfactant system of this disclosure can also be present in the detergent composition at a concentration between any of these recited percentages.

The surfactant system may include an anionic surfactant, a nonionic surfactant, or a combination of the anionic surfactant and the nonionic surfactant.

Furthermore, where the surfactant system includes a combination of anionic and nonionic surfactants, the weight ratio, of the anionic surfactant to the nonionic surfactant in the surfactant system may be from about 2 to about 1.

Non-limiting examples of suitable anionic surfactants include aliphatic sulphates, aliphatic sulfonates (e.g., C8 to C22 sulfonate or disulfonate), aromatic sulfonates (e.g., alkyl benzene sulfonates), alkyl sulfoccinates, alkyl and acyl taurates, alkyl and acyl sarcosinates, sulfoacetates, alkyl phosphates, carboxylates, isethionates, and the like, and any combination thereof.

Non-limiting examples of suitable nonionic surfactants include aliphatic alcohols, acids, amides or alkyl phenols with alkylene oxides, sugar amides, alkyl polysaccharides, and the like, and combinations thereof.

The surfactant system may also include cationic surfactants, amphoteric surfactants, or combinations thereof. Or, the surfactant system may not include cationic surfactants. The surfactant system may include anionic, nonionic, and amphoteric surfactants. It is also contemplated that the surfactant system does not include any other surfactants other than anionic and/or nonionic surfactants.

The present detergent compositions may also contain, incrustation inhibitors, perfumes, bleaches, corrosion inhibitors, antifoamers, optical brighteners, enzymes, and the like, or combinations thereof. It is also contemplated that any of these additives may be omitted from the detergent composition.

Incorporating an ultra-low molecular weight polysaccharide into a liquid detergent composition may also increase the viscosity of the overall detergent composition, which is beneficial in that the ultra-low molecular weight polysaccharide can therefore provide a detergent composition with a desired viscosity profile for purposes of appearance and/or rheology for dosage use.

It is known that conventional detergents generally contain a blend of anionic and nonionic surfactants to optimize performance and cost effectiveness. However, surfactants by themselves are known to have insufficient anti-redepositioning properties, and therefore using these conventional detergents can lead to greying of textiles, such as fabrics. As a result, anti-redeposition agents, such as CMC, are used in combination with these surfactants. CMC functions as an anti-redeposition agent by being selectively absorbed by textiles, such as cotton-based textiles, through hydrogen bonding. The anti-redeposition properties of CMC are due to the electrostatic repulsion between negatively charged dirt particles and the negative charge of the carboxymethyl groups. Thus, the CMC functions in detergents as, among other things, a dirt carrier and prevents secondary deposition on the textiles.

The present liquid detergent compositions with the ultra-low molecular weight polysaccharides also have improved anti-redeposition properties compared to a conventional detergent composition (i.e., a detergent composition comprising conventional polysaccharides) and to detergent compositions with structuring agents. It is also believed that the present powder detergent compositions could also have improved anti-redeposition properties compared to conventional detergent compositions. Without being bound by a single theory, it is believed that the ultra-low molecular weight polysaccharide can more easily penetrate in the cavities of the surface of fabrics as compared to conventional polysaccharides, and can also penetrate areas of the fabric where conventional polysaccharides cannot, and therefore detergent compositions, at least liquid detergent compositions, have improved anti-redepositioning. For example, the anti-redeposition may be high as reflected by an average measured reflectance of more than 7 units when compare to a control without the CMC. For example the average measured reflectance may be more than 10, 11, 12, 13, 14, 15, 16, 17, 18, 19, 20, 21, 22, 23, 24 or 25 at 0.1, 0.2, 0.3, 0.4 or 0.5% CMC or anionic cellulose by weight concentration of detergent. The compositions may have superior transmittance as described in paragraph 26, phase separation as described in paragraph 29 and/or anti-redeposition as described above.

The properties of the ultra-low molecular weight polysaccharide affect the concentration to be used in the detergent composition and the properties of the detergent composition. If at the lower end of the molecular weight range, then higher concentrations of the ultra-low molecular weight polysaccharide may be used to attain certain properties. If at the higher end of the molecular weight range, then lower concentrations of the ultra-low molecular weight polysaccharide may be used to attain certain properties. Additionally, the properties of the ultra-low molecular weight polysaccharide can affect the surfactant concentration to be used in the detergent composition. The skilled person would be able to vary these parameters and test detergents for the advantageous phase separation, transmittance or anti-redeposition features using the protocols provided. The detergent composition may include an ultra-low molecular weight polysaccharide at a concentration from about 0.05% to about 2% by weight of the detergent composition and a surfactant system at a concentration from about 10% to about 40% by weight of the detergent composition, wherein the ultra-low molecular weight polysaccharide has a molecular weight from about 1,000 Da to about 30,000 Da. For example, the detergent composition may include an ultra-low molecular weight polysaccharide at a concentration from about 0.05% to about 2% by weight of the detergent composition and a surfactant system at a concentration from about 1% to about 35% by weight of the detergent composition, wherein the ultra-low molecular weight polysaccharide has a molecular weight from about 30,000 Da to 80,000 Da. In other examples, the detergent composition may include an ultra-low molecular weight polysaccharide at a concentration from about 0.1% to about 0.3% by weight of the detergent composition and a surfactant system at a concentration from about 0.01% to about 30% by weight of the detergent composition, wherein the ultra-low molecular weight polysaccharide has a molecular weight from about 50,000 Da to 80,000 Da.

The detergent compositions described herein may be made using any known methods.

For example, the method may include adding an ultra-low molecular weight polysaccharide to a surfactant system to form a detergent mixture, wherein the surfactant system comprises an anionic surfactant and a nonionic surfactant and is present in the mixture at a concentration from about 0.01% to about 70% by weight of the mixture.

The method may further include providing the ultra-low molecular weight polysaccharide. For example, providing the ultra-low molecular weight polysaccharide may include depolymerizing a starting material of a polysaccharide having a conventional molecular weight to form the ultra-low molecular weight polysaccharide.

Generally, the starting material may be depolymerized by any techniques known in the art, such as those disclosed in EP 382577, GB 2,281,073, EP 708113, WO 2005/012540, U.S. Patent Publication No. 2005/0209449, U.S. Patent Publication No. 2010/0063269, U.S. Pat. No. 6,054,511, all of which are incorporated herein by reference. For example, the starting material may be depolymerized with hydrogen peroxide in water or, the starting cellulose material is depolymerized with enzymes or acid.

The ultra-low molecular weight polysaccharide may be in the form of a liquid when added to the surfactant system. Or, the ultra-low molecular weight polysaccharide may be in particulate form when added to the surfactant system.

Optionally, the surfactant system is in the form of a liquid. Where the surfactant system is in liquid form, the ultra-low molecular weight polysaccharide may be in liquid form when it is added to the surfactant system. Or where the surfactant system is in liquid form, the ultra-low molecular weight polysaccharide may be in particulate form when it is added to the surfactant system.

In a further example, the surfactant system may be in particulate form. Where the surfactant system is in particulate form, the ultra-low molecular weight polysaccharide may be in liquid form when it is added to the surfactant system. Or where the surfactant system is in particulate form, the ultra-low molecular weight polysaccharide may be in particulate form when it is added to the surfactant system.

The detergent compositions may be further understood with the following non-limiting examples.

EXAMPLES

Protocol 1: Determination of the Molecular Weight (Mw, Mp)

The molecular weight of the CMC was measured using a GPCmax VE GPC solvent/sample module (Viscotek), column oven, 270 Dual Detector and Shodex RI-71. Prior to measurement, a narrow standard Pullulan was used to calibrate the system. 10 milligrams of CMC was dissolved in 0.1 M NaNO3+10% MeOH eluent at a concentration of 1 mg/ml and mixed for 16 hours to form a test sample. The sample was filtrated through a 0.2 μm filter and 100 microliters of the filtered sample was injected into two Viscotek A600M General Mixed 300*8.0 mm columns at a flow of 0.8 ml/min. Right angle Light scattering, Viscosity and Refractive Index detectors (Viscotek) were then used to analyze the sample. The OmniSec (Viscotek) software converted the detector signals to molecular weight values and calculated the weight average molecular weight ($M_w$) and peak molecular weight ($M_p$).

Protocol 2: Determination of Transmittance

The solution clarity was determined by measuring the transmittance of a sample by UV-VIS (Genesys 6, ThermoSpectronic) at 600 nm. A sample of CMC was added to a liquid detergent and mixed with a propeller mixer at 400 rpm for 1 hour at 25° C. to form a test sample. For a 0.1% CMC concentration sample, 1 gram (dry weight) CMC/999 grams liquid detergent was used and for a 0.5% CMC concentration, 5 grams (dry weight) CMC/995 grams liquid detergent was used. The test sample was then stored for 40 days at 37° C. in a water bath. If any phase separation was observed, the premixed sample was mixed with a spatula before analyzing. For each test sample, there was a reference sample of the liquid detergent without CMC of which its transmittance is also measured and used as a reference. The greater the transmittance (%), the clearer the sample was.

Protocol 3: Determination of Anti-Redeposition Property

The anti-deposition property of a sample was measured using a Tergotometer (Copley Scientific, Nottingham, United Kingdom). Four different commercial liquid detergents and one standardized liquid detergent AATCC 2003 were used. AATCC 2003 Liquid Reference Detergent WOB (available from Testgewebe GmbH, Bruggen, Germany) was used having a composition of: 12.0% Linear sodium alkylbenzene sulfonate sodium salt, 8.0% Nonionic surfactant, 1.2% Citric acid (as sodium citrate), 4.0% Fatty acid (C24 sodium salt), 2.7% Sodium Hydroxide, 0.3% Chelant (DTPA), 8.0% Stabilizers (Propanediol), 1.0% Preservative (Borax) and water to balance the formulation. For each different liquid detergent, a control test sample was prepared, which included the detergent itself and no CMC. The use levels of each liquid detergent are described in the below table:

TABLE 1

Detergent dosages used in Tergotometer testing

| Detergent | Dosage (g/L) |
|---|---|
| Ecover | 5.661 |
| Erisan Sensitive | 3.330 |
| Serto | 2.996 |
| Bio Luvil Sensitive | 4.995 |
| AATCC 2003 | 4.000 |

For each test sample, a pot was filled with 800 mL of water with a water hardness of 18° dH and at a temperature of 25° C. CMC was then added to the pot at either 0.1% based on the liquid detergent or 0.5% based on the liquid detergent. Eight 5 cm*5 cm white cotton swatches (Warwick Equest, Stanley, Durham, United Kingdom), 0.16 g carbon black, and a liquid detergent amount based on Table 1 was added to the pot.

For each control sample, a pot was filled with 800 mL of water with a water hardness of 18° dH and at a temperature of 25° C. Eight 5 cm*5 cm white cotton swatches (Warwick Equest, Stanley, Durham, United Kingdom), 0.16 g carbon black, and a liquid detergent amount based on Table 1 was added to the pot. No CMC was added to a control sample.

For each sample, the swatches underwent washing with agitation of 200 rpm and at a temperature of 25° C., after which the swatches underwent rinsing in water with a water hardness of 18° dH and at a temperature of 25° C. Total washing time was 60 minutes and total rinsing time was 15 minutes. Swatches were then dried overnight at 25° C. and then ironed.

The reflectance of each swatch was then measured by a Minolta CM-3600d instrument (Konica). Prior to measurement, the Minolta CM-3600d was calibrated by primary reference papers (CIE Whiteness D65/10° and ISO Brightness) from Inventia AB, Sweden. Secondary calibration was done by reference fabrics (CIE Whiteness D65/10° and Ganz Griesser) from Hohenstein Laboratories GmbH&Co.KG, Germany. The reflectance of each swatch of the test sample and of each swatch of the control sample was measured and then averaged. The difference between the average measured reflectance of the test sample and of the control sample was then calculated. The greater the difference, the whiter (less grey) the fabric swatch was, and consequently the more effective the anti-redeposition property of the test sample was compared to the control sample. Test samples having an average measured reflectance that was less than 7 units compared to its control sample was considered undesirable.

Protocol 4: Determination of Anti-Redeposition Property Effect after Storage with CMC Pre-Mixed into Liquid Detergent CMC was premixed with AATCC 2003 Liquid Reference Detergent WOB to a concentration of 0.5 weight percent CMC and then divided into two sets, one set was allowed to stand at room temperature for one day ("fresh") and the other set was stored for 40 days at 37° C. ("aged"). Both the fresh and aged premix samples were tested for anti-redeposition property with the results shown in Table 3. If any phase separation was observed, the premixed sample was mixed before dosing to a pot. A pot was filled with 800 mL of water with a water hardness of 18° dH and at a temperature of 25° C. Eight 5 cm*5 cm white cotton swatches (Warwick Equest, Stanley, Country Durham, United Kingdom), 0.16 g carbon black, and the premixed sample was added to the pot. Otherwise the test protocol followed Protocol 3.

Protocol 5: Determination of Stability

A sample of CMC was added to a liquid detergent and mixed with a propeller mixer at 400 rpm for 1 hour at 25° C. to form a test sample. For a 0.1% CMC concentration sample, 1 gram (dry weight) CMC/999 grams liquid detergent was used and for a 0.5% CMC concentration, 5 grams (dry weight) CMC/995 grams liquid detergent was used. The mixed sample was stored in a closed glass bottle for 40 days at 37° C. in a water bath. After storage, the sample was cooled to room temperature and mixed with a spatula. 10 mL of the mixed sample was then taken to a 15 mL centrifugation tube (Duran Assistent, Germany). The sample was then centrifuged for 30 min at 5000 rpm (Centrifuge 5804, Eppendorf) to separate the phases (solid and liquid) of the sample. The solid phase was measured from the bottom of the centrifuge tube. The amount of solid, measured in millimeters, of the sample indicated the stability of the sample. Above 3 mm in this test was considered an undesirable level.

Example 1

Preparation of an Ultra-Low Molecular Weight CMC Having a Molecular Weight Less than 30,000 Da 1507 grams of tap water was added into a vessel equipped with a mixer. The temperature was then adjusted to 70° C., after which 100 grams of hydrogen peroxide solution (aqueous hydrogen peroxide solution, 50% active) was added to the vessel to form a mixture. 974.66 grams of CMC powder (ultra-low molecular weight CMC made by CP Kelco Oy in Aanekoski, Finland, moisture content 7.7%, molecular weight 40,000 Da) and an additional 300 grams of hydrogen peroxide solution was then added step wise to the mixture, while the mixture was simultaneously mixed using the mixer. Releasing oxygen was also removed from the top of the vessel by nitrogen flushing. 97.0 grams of caustic (aqueous sodium hydroxide solution, 50% active) was then added to the mixture, which was added to accelerate hydrogen peroxide reaction and adjust the pH of the mixture to 7.0. Once the 300 grams of hydrogen peroxide reacted, which was confirmed by using indicator slips for residual peroxide detection, the mixture was then cooled to 25° C. to form an ultra-low molecular weight CMC having a molecular weight of 4,000 Da.

Example 2

Performance Testing

- Sample 1, an ultra-low molecular weight CMC of Example 1 with molecular weight of 4,000 Da, molecular weight peak of 2,500 Da, and unimodal molecular weight distribution.
- Sample 2, a commercially available CMC from CP Kelco with an ultra-low molecular weight CMC of 40,000 Da, molecular weight peak of 20,000 Da, and unimodal molecular weight distribution.
- Sample 3, Finnfix® 30 a conventional molecular weight CMC, molecular weight 90,000 Da, molecular weight peaks of 80,000 and 20,000 Da, and bimodal molecular weight distribution.
- Sample 4, Finnfix® 300 a conventional molecular weight CMC, molecular weight of 150,000 Da, molecular weight peaks of 140,000 and 20,000 Da, and bimodal molecular weight distribution.

TABLE 2

Performance Test Results

| Sample | CMC concentration (%)/Mw (Da) | Liquid Detergent | Transmittance (%)* | Stability (mm)** | Anti-Redeposition (CIE D65/10 + UV)*** |
|---|---|---|---|---|---|
| Sample 1 | 0.5/4,000 | Ecover | 97 | 1 | 26.4 ± 1.1 |
| Sample 2 | 0.5/40,000 | Ecover | 5 | 4 | 26.8 ± 0.9 |
| Sample 3 | 0.5/90,000 | Ecover | 7 | 13 | 31.4 ± 1.7 |
| Sample 4 | 0.5/150,000 | Ecover | 10 | 14 | 28.2 ± 1.0 |
| Sample 1 | 0.1/4,000 | Ecover | 100 | 0 | 13.1 ± 1.5 |
| Sample 2 | 0.1/40,000 | Ecover | 93 | 1 | 12.6 ± 1.1 |
| Sample 3 | 0.1/90,000 | Ecover | 73 | 3 | 10.8 ± 1.1 |
| Sample 4 | 0.1/150,000 | Ecover | 88 | 3 | 9.4 ± 1.9 |
| Sample 1 | 0.5/4,000 | Erisan | 99 | 3 | 22.9 ± 1.0 |
| Sample 2 | 0.5/40,000 | Erisan | 20 | 9 | 21.8 ± 2.0 |
| Sample 3 | 0.5/90,000 | Erisan | 63 | 13 | 22.6 ± 1.4 |
| Sample 4 | 0.5/150,000 | Erisan | 59 | 15 | 18.7 ± 0.6 |
| Sample 1 | 0.1/4,000 | Erisan | 100 | 0 | 9.9 ± 1.7 |
| Sample 2 | 0.1/40,000 | Erisan | 99 | 3 | 7.5 ± 3.4 |
| Sample 3 | 0.1/90,000 | Erisan | 92 | 3 | 7.6 ± 2.0 |
| Sample 4 | 0.1/150,000 | Erisan | 95 | 4 | 2.5 ± 3.8 |
| Sample 1 | 0.5/4,000 | Serto | 100 | 3 | 17.8 ± 1.2 |
| Sample 2 | 0.5/40,000 | Serto | 4 | 13 | 19.2 ± 0.5 |
| Sample 3 | 0.5/90,000 | Serto | 8 | 15 | 15.8 ± 1.2 |
| Sample 4 | 0.5/150,000 | Serto | 19 | 17 | 14.1 ± 1.5 |
| Sample 1 | 0.1/4,000 | Serto | 100 | 0 | 10.5 ± 1.7 |
| Sample 2 | 0.1/40,000 | Serto | 62 | 3 | 13.9 ± 2.1 |
| Sample 3 | 0.1/90,000 | Serto | 76 | 2 | 5.1 ± 1.9 |
| Sample 4 | 0.1/150,000 | Serto | 85 | 4 | 2.4 ± 2.5 |
| Sample 1 | 0.5/4,000 | BioLuvil | 100 | 0 | 28.0 ± 1.3 |
| Sample 2 | 0.5/40,000 | BioLuvil | 4 | 8 | 27.1 ± 1.0 |
| Sample 3 | 0.5/90,000 | BioLuvil | 2 | 7 | 27.8 ± 1.5 |
| Sample 4 | 0.5/150,000 | BioLuvil | 2 | 7 | 25.1 ± 2.3 |
| Sample 1 | 0.1/4,000 | BioLuvil | 94 | 0 | 6.9 ± 2.0 |
| Sample 2 | 0.1/40,000 | BioLuvil | 84 | 1 | 7.8 ± 2.4 |

TABLE 2-continued

| Performance Test Results | | | | | |
|---|---|---|---|---|---|
| Sample | CMC concentration (%)/Mw (Da) | Liquid Detergent | Transmittance (%)* | Stability (mm)** | Anti-Redeposition (CIE D65/10 + UV)*** |
| Sample 3 | 0.1/90,000 | BioLuvil | 46 | 2 | 6.1 ± 2.1 |
| Sample 4 | 0.1/150,000 | BioLuvil | 40 | 4 | 0 ± 1.30 |
| Sample 1 | 0.5/4,000 | AATCC 2003 | 96 | 0 | 21.4 ± 0.7 |
| Sample 2 | 0.5/40,000 | AATCC 2003 | 16 | 8 | 20.2 ± 0.9 |
| Sample 3 | 0.5/90,000 | AATCC 2003 | 54 | 9 | 21.4 ± 0.6 |
| Sample 4 | 0.5/150,000 | AATCC 2003 | 40 | 10 | 18.8 ± 0.5 |
| Sample 1 | 0.1/4,000 | AATCC 2003 | 100 | 0 | 9.8 ± 0.9 |
| Sample 2 | 0.1/40,000 | AATCC 2003 | 94 | 0 | 10.8 ± 0.7 |
| Sample 3 | 0.1/90,000 | AATCC 2003 | 90 | 3 | 9.2 ± 0.8 |
| Sample 4 | 0.1/150,000 | AATCC 2003 | 82 | 3 | 4.4 ± 0.9 |

*Test done by following Protocol 2
**Test done by following Protocol 5
***Test done by following Protocol 3

TABLE 3

| Influence of Storage on Anti-Redeposition Performance | | | |
|---|---|---|---|
| Sample | CMC Concentration (%)/Mw (Da) | Anti-Redepositioning (CIE D65/10 + UV) fresh premixed* | Anti-Redepositioning (CIE D65/10 + UV) aged premixed* |
| Sample 1 | 0.5/4,000 | 16.7 ± 1.3 | 15.7 ± 0.8 |
| Sample 2 | 0.5/40,000 | 17.7 ± 0.8 | 12.5 ± 1.0 |
| Sample 3 | 0.5/90,000 | 16.0 ± 0.6 | 13.6 ± 0.9 |
| Sample 4 | 0.5/150,000 | 14.0 ± 0.8 | 13.0 ± 0.8 |

*Test done by following Protocol 4

As can be seen from the Table 2 at 0.5% CMC dosage levels, Sample 1 results in high clarity (high transmittance value, 96-100%) and good stability (low phase separation, 0-3 mm) of the liquid detergents. At 0.5% CMC use level, Sample 2 give clearly hazier liquid detergents after 40 days stability test compared to Sample 1. The stability of Sample 2 at 0.5% use level is however better compared to the stability of the Samples 3 and 4 at 0.5% use level after 40 days. Additionally, Sample 1 and 2 give similar, and in certain instances superior, anti-redeposition results compared to Samples 3 and 4 in liquid detergents at 0.5% use level.

Moreover as can be seen from Table 2 at 0.1% CMC dosage levels, Sample 1 with use level of 0.1% gives the highest clarity and stability when compared to the other Samples. Sample 2 at 0.1% use level shows increased clarity and stability compared to use level of 0.5% (transmittance higher than 60%) with little phase separation (1-3 mm). Furthermore, Samples 1 and 2 at use level 0.1% generally have similar, and in most instances superior, anti-redepositioning results as compared to Samples 3 and 4 at 0.1% use level.

The results in Table 3 show that anti-redeposition performance is a bit lower after storage time compared to freshly tested liquid detergent and CMC, but after storing 40 days at 37° C. degrees the anti-redeposition performance is still at a very high level (increase in whiteness is more than 7 units). So, based on results shown in Table 2 and 3, it can be concluded that ultra low molecular weight CMC is compatible with variable liquid detergents, it gives very good anti-redeposition properties in general and the anti-redeposition performance remains high after the storage of the liquid detergent.

Based on these results incorporating ultra-low molecular weight CMC into commercial liquid detergents, rather than using conventional CMC that typically requires structuring agents or ultrafine milling to have suitable clarity and stability, is beneficial for providing desired liquid detergents with suitable clarity, stability and anti-redeposition properties.

The following numbered embodiments, aspects, and features of the disclosure are provided, with an emphasis on the ability to combine the various features which may disclosed only in certain embodiments, into other disclosed embodiments, as the context and technical reason allow.

ASPECTS

Clause 1. A detergent composition comprising a polysaccharide selected from the group consisting of a carboxymethyl cellulose component, an anionic cellulose derivative, and mixtures thereof, and a surfactant system; wherein the polysaccharide has a weight average molecular weight of no greater than from about 1,000 Dalton to 80,000 Dalton.

Clause 2. The detergent composition of clause 1, wherein the polysaccharide has a molecular weight from about 1,000 Da to about 40,000 Da.

Clause 3. The detergent composition of clause 1, wherein the polysaccharide has a molecular weight from about 1,000 Da to about 30,000 Da.

Clause 4. The detergent composition of clause 1, wherein the polysaccharide has a molecular weight from about 1,000 Da to about 15,000 Da.

Clause 5. The detergent composition of any one of clauses 1 to 4, wherein the polysaccharide has a molecular weight peak no greater than about 80,000 Da.

Clause 6. The detergent composition of any one of clauses 1 to 4, wherein the polysaccharide has a molecular weight peak of from about 750 Da to about 80,000 Da.

Clause 7. The detergent composition of any one of clauses 1 to 6, wherein the polysaccharide is the carboxymethyl cellulose component.

Clause 8. The detergent composition of clause 7, wherein the carboxymethyl cellulose component is sodium carboxymethyl cellulose.

Clause 9. The detergent composition of clause 7, wherein the carboxymethyl cellulose component is a modified carboxymethyl cellulose.

Clause 10. The detergent composition of clause 7, wherein the carboxymethyl cellulose component is a hydrophobic-modified carboxymethyl cellulose.

Clause 11. The detergent composition of clause 7, wherein the carboxymethyl cellulose component is a cationic-modified carboxymethyl cellulose.

Clause 12. The detergent composition of clause 7, wherein the carboxymethyl cellulose component is a sulfate- or sulfonate-modified carboxymethyl cellulose.

Clause 13. The detergent composition of any one of clauses 7 to 12, wherein the carboxymethyl cellulose component has a degree of substitution from about 0.2 to about 1.5.

Clause 14. The detergent composition of clause 13, wherein the carboxymethyl cellulose component has a degree of substitution from about 0.4 to about 1.2.

Clause 15. The detergent composition of clause 13, wherein the carboxymethyl cellulose component has a degree of substitution from about 0.6 to about 1.

Clause 16. The detergent composition of any one of clauses 1 to 15, wherein the carboxymethyl cellulose component is present in the detergent composition at a concentration from about 0.005% to about 10% by weight of the detergent composition.

Clause 17. The detergent composition of any one of clauses 1 to 15, wherein the carboxymethyl cellulose component is present in the detergent composition at a concentration from about 0.01% to about 5% by weight of the detergent composition.

Clause 18. The detergent composition of any one of clauses 1 to 15, wherein the carboxymethyl cellulose component is present in the detergent composition at a concentration from about 0.05% to about 2% by weight of the detergent composition.

Clause 19. The detergent composition of any one of clauses 1 to 18, wherein the surfactant system is present in the detergent composition at a concentration from about 0.01% to about 70% by weight of the detergent composition.

Clause 20. The detergent composition of any one of clauses 1 to 18, wherein the surfactant system is present in the detergent composition at a concentration from about 1% to about 40% by weight of the detergent composition.

Clause 21. The detergent composition of any one of clauses 1 to 18, wherein the surfactant system is present in the detergent composition at a concentration from about 10% to about 40% by weight of the detergent composition.

Clause 22. The detergent composition of any one of clauses 1 to 21, wherein the surfactant system comprises an anionic surfactant, a nonionic surfactant, or a combination of the anionic surfactant and the nonionic surfactant.

Clause 23. The detergent composition of clause 22, wherein the weight ratio of anionic surfactant to nonionic surfactant in the surfactant system is from about 2 to about 1.

Clause 24. The detergent composition of any one of clauses 1 to 23, wherein the detergent composition does not comprise a cellulosic fibrous structuring agent.

Clause 25. The detergent composition of any one of clauses 1 to 24, wherein the detergent composition is in liquid form.

Clause 26. The detergent composition of any one of clauses 1 to 24, wherein the detergent composition is in particulate form.

Clause 27. A laundry detergent composition comprising a carboxymethyl cellulose component at a concentration from about 0.005% to about 10% by weight of the detergent composition and a surfactant system at a concentration from about 0.01% to about 70% by weight of the detergent composition; wherein the carboxymethyl cellulose component has a weight average molecular weight of no greater than from about 1,000 Da to 80,000 Da, any molecular weight peak of the carboxymethyl cellulose component is no greater than about 80,000 Da, and the laundry detergent composition is in a liquid form.

Clause 28. The laundry detergent composition of clause 27 wherein any molecular weight peak of the carboxymethyl cellulose component is from about 750 Da to about 60,000 Da.

It will be appreciated that various above-disclosed and other features and functions, or alternatives thereof, may be desirably combined into many other different products or applications. Various presently unforeseen or unanticipated alternatives, modifications, variations, or improvements therein may be subsequently made by those skilled in the art which are also intended to be encompassed by the following claims.

We claim:

1. A detergent composition comprising a polysaccharide and from about 5% to about 70% by weight of a surfactant system, based on a total weight of the composition; wherein the polysaccharide is selected from the group consisting of a carboxymethyl cellulose component, an anionic cellulose derivative, and mixtures thereof; wherein the polysaccharide has a weight average molecular weight in a range of from about 1,000 Dalton to 40,000 Dalton; and wherein the detergent composition does not contain any polysaccharide having a molecular weight peak greater than about 80,000 Dalton.

2. The detergent composition of claim 1, wherein the polysaccharide has a weight average molecular weight from about 1,000 Da to about 30,000 Da.

3. The detergent composition of claim 1, wherein the polysaccharide is the carboxymethyl cellulose component.

4. The detergent composition of claim 3, wherein the carboxymethyl cellulose component is:

a) sodium carboxymethyl cellulose; or b) a modified carboxymethyl cellulose; or c) a hydrophobic-modified carboxymethyl cellulose; or d) cationic-modified carboxymethyl cellulose; or e) a sulfate- or sulfonate-modified carboxymethyl cellulose.

5. The detergent composition of claim 3, wherein the carboxymethyl cellulose component has a degree of substitution from about 0.2 to about 1.5.

6. The detergent composition of claim 1, wherein the polysaccharide is present in the detergent composition at a concentration from about 0.005% to about 10% by weight of the detergent composition.

7. The detergent composition of claim 1, wherein the surfactant system is present in the detergent composition at a concentration from about 10% to about 40% by weight of the detergent composition.

8. The detergent composition of claim 1, wherein the surfactant system comprises an anionic surfactant, a nonionic surfactant, or a combination of the anionic surfactant and the nonionic surfactant.

9. The detergent composition of claim 8, wherein the weight ratio of anionic surfactant to nonionic surfactant in the surfactant system is from about 2 to about 1.

10. The detergent composition of claim 1, wherein the detergent composition does not comprise a cellulosic fibrous structuring agent.

11. The detergent composition of claim 1, wherein the detergent composition is in liquid form or particulate form.

12. A laundry detergent composition comprising a carboxymethyl cellulose component at a concentration from about 0.005% to about 10% by weight of the detergent composition and a surfactant system at a concentration from about 5% to about 70% by weight of the detergent composition; wherein the carboxymethyl cellulose component has a weight average molecular weight in a range of from about 1,000 Da to 40,000 Da, the laundry detergent does not comprise any polysaccharide having a molecular weight peak greater than about 80,000 Da, and the laundry detergent composition is in a liquid form.

13. A detergent composition comprising a polysaccharide and from about 5% to about 70% by weight of a surfactant system, based on a total weight of the composition; wherein the polysaccharide is selected from the group consisting of a carboxymethyl cellulose component, an anionic cellulose derivative, and mixtures thereof; wherein the polysaccharide has a weight average molecular weight in a range of from about 1,000 Dalton to 40,000 Dalton; wherein the detergent composition does not comprise any polysaccharide having a molecular weight peak greater than about 80,000 Dalton; and wherein the detergent composition does not comprise a bacterial cellulose.

14. A method of cleaning an article selected from clothes or dishes, said method comprising washing the article in the presence of a detergent composition, said detergent composition comprising a polysaccharide and from about 5% to about 70% by weight of a surfactant system, based on a total weight of the composition; wherein the polysaccharide is selected from the group consisting of a carboxymethyl cellulose component, an anionic cellulose derivative, and mixtures thereof; wherein the polysaccharide has a weight average molecular weight in a range of from about 1,000 Dalton to 40,000 Dalton; and wherein the detergent composition does not contain any polysaccharide having a molecular weight peak greater than about 80,000 Dalton.

15. The detergent composition of claim 1, wherein the polysaccharide has a weight average molecular weight from about 1,000 Da to about 15,000 Da.

16. The laundry detergent composition of claim 12, wherein the polysaccharide has a weight average molecular weight from about 1,000 Da to about 15,000 Da.

17. The detergent composition of claim 13, wherein the polysaccharide has a weight average molecular weight from about 1,000 Da to about 15,000 Da.

18. The method of claim 14, wherein the polysaccharide has a weight average molecular weight from about 1,000 Da to about 15,000 Da.

19. The detergent composition of claim 12, wherein the polysaccharide has a weight average molecular weight from about 1,000 Da to about 30,000 Da.

20. The detergent composition of claim 13, wherein the polysaccharide has a weight average molecular weight from about 1,000 Da to about 30,000 Da.

21. The method of claim 14, wherein the polysaccharide has a weight average molecular weight from about 1,000 Da to about 30,000 Da.

* * * * *